(12) United States Patent
Chacko et al.

(10) Patent No.: US 11,694,851 B2
(45) Date of Patent: Jul. 4, 2023

(54) CAPACITORS WITH IMPROVED POWER CYCLING

(71) Applicant: KEMET Electronics Corporation, Simpsonville, SC (US)

(72) Inventors: Antony P. Chacko, Simpsonville, SC (US); John Joseph Ols, Simpsonville, SC (US); Ajaykumar Bunha, Simpsonville, SC (US); Yaru Shi, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 317 days.

(21) Appl. No.: 17/178,631

(22) Filed: Feb. 18, 2021

(65) Prior Publication Data

US 2022/0262569 A1 Aug. 18, 2022

(51) Int. Cl.
   *H01G 9/15* (2006.01)
   *H01G 9/028* (2006.01)

(52) U.S. Cl.
   CPC .............. *H01G 9/15* (2013.01); *H01G 9/028* (2013.01)

(58) Field of Classification Search
   CPC combination set(s) only.
   See application file for complete search history.

(56) References Cited

U.S. PATENT DOCUMENTS

| | | |
|---|---|---|
| 4,858,078 A | 8/1989 | Morimoto et al. |
| 7,106,575 B2 | 9/2006 | Taketani et al. |
| 10,340,091 B2 | 7/2019 | Bunha et al. |
| 2006/0044736 A1* | 3/2006 | Taketani ............. H01G 9/15 361/523 |

(Continued)

*Primary Examiner* — David M Sinclair
(74) *Attorney, Agent, or Firm* — Joseph T. Guy; Patent Filing Specialist Inc.

(57) ABSTRACT

An improved electrolytic capacitor, and method of making the electrolytic capacitor, is provided. The electrolytic capacitor comprises an anode comprising a dielectric layer on the anode. A primary conductive polymer layer is on dielectric and a mordant layer on the primary conductive polymer layer wherein the mordant layer comprises a mordant compound of Formula A;

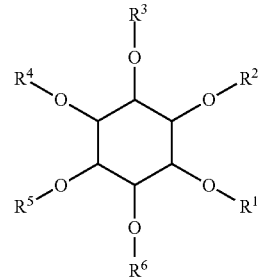

Formula A wherein:
each of $R^1$-$R^6$ is independently selected from H and —PO$(OR^7)_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$. A secondary conductive polymer layer is on the mordant layer.

70 Claims, 2 Drawing Sheets

(56) References Cited

U.S. PATENT DOCUMENTS

| | | | | |
|---|---|---|---|---|
| 2010/0079928 A1* | 4/2010 | Harada | ................ | H01G 9/0029 |
| | | | | 361/523 |
| 2015/0029642 A1* | 1/2015 | Shi | ....................... | H01G 9/0036 |
| | | | | 29/25.03 |
| 2016/0300665 A1* | 10/2016 | Ning | .................... | H01G 9/0425 |
| 2016/0351339 A1* | 12/2016 | Uher | ......................... | B22F 7/06 |
| 2018/0330888 A1* | 11/2018 | Shi | ......................... | H01G 9/028 |

* cited by examiner

CAPACITORS WITH IMPROVED POWER CYCLING

FIELD OF THE INVENTION

The present invention is related to improvements in electrolytic capacitors and more specifically to capacitance stability during cycling. More specifically, the present invention is related to an improved electrolytic capacitor comprising a mordant layer which improves capacitance stability.

BACKGROUND

There is an ever-increasing desire for electronic devices having increased functionality which can be used over a longer period of time without failure. Efforts to provide these benefits have influenced every element of electronic devices. The present invention is related to elimination of failure modes which occur at the electronic component level and most specifically within an electrolytic capacitor.

Solid electrolyte capacitors have emerged as a major tool in the development of electronic components. Solid electrolytic capacitors, particularly those utilizing valve metal anodes, originally emerged comprising a pressed powder anode with a dielectric on the anode and manganese dioxide as the conductive layer on the dielectric wherein the manganese dioxide functioned as the cathode. The manganese dioxide was replaced by capacitors comprising conductive polymer as the cathode layer due, in part, to their non-burning failure mode. Of these solid electrolytic capacitors comprising polythiophene based conductive polymers have proven to be the most desirable.

As demands continued to increase, those of skill in the art continued to refine the art of valve metal capacitor manufacturing resulting in powders with higher charge density such as 50,000 CV/g or above. As the charge density of the powder increases the internal surface area of the anode formed from the powder increases and the pore size of the pressed powder decreases. This complicates the use of conductive polymer cathodes since it is difficult to deposit conductive polymer on the interstitial surfaces of the anode to the degree necessary to cover a sufficient amount of the dielectric.

The problem of poor interstitial surface area coverage has been significantly mitigated by the application of multiple layers of conductive polymer wherein the internal layers and external layers are different formulations. One approach, which has enjoyed much success, is the formation of a primary conductive polymer layer, the one directly on the dielectric, by in-situ polymerization wherein monomers of the polymer are polymerized in-situ. Though this is beneficial for the formation of the initial layer the outer layers of conductive polymer are preferably formed from slurries of pre-formed conductive polymer. The conductive polymer slurries are prepared from a dispersion of PEDOT:Polyanion particles and other additives in water. The polyanion can be polystyrene sulphonic acid or their copolymers. Such polyanion copolymers are described in U.S. Pat. No. 10,340,091. An alternative method is the formation of the primary conductive polymer layer from a slurry of preformed conductive polymer wherein the slurry has very small particles of conductive polymer including below detectable limits wherein the conductive polymer is referred to herein as being soluble. Both of these methods are advantageous for coating the interstitial areas of a porous anode to form a coating on the dielectric thereon. Secondary conductive layers are then preferably formed on the primary conductive polymer layer by the deposition of slurries comprising preformed conductive polymer.

The use of different formulations or techniques for depositing the conductive polymer has led to a reduction in the stability of the capacitor, particularly, during power cycling. While not limited to theory it is hypothesized that either the polymer layers are incompatible or insufficiently filled the pores or a charge barrier is created. Incompatibility of adjacent layers could lead to delamination upon power cycling within the polymer layers themselves or at the dielectric. The creation of charge barriers, referred to as anomalous charge current, could lead to failure of the conductive polymer layer in a mechanism which is not understood.

Provided herein is a novel mordanted layer, between adjacent conductive polymer layers wherein the mordant layer mitigates delamination or breakdown of the conductive polymer cathode.

SUMMARY OF THE INVENTION

The present invention is directed to an improved capacitor comprising a mordant layer which is stable, particularly, when power cycling.

A particular feature of the invention is a mordant layer which improves the stability of the conductive polymer layers wherein polymer layer breakdown, particularly when power cycling, is mitigated.

Another feature of the invention is the ability to manufacture the improved capacitor with the mordant layer using existing manufacturing methods.

These and other advantages, as will be realized, are provided in an electrolytic capacitor. The electrolytic capacitor comprises an anode comprising a dielectric layer on the anode. A primary conductive polymer layer is on dielectric and a mordant layer on the primary conductive layer wherein the mordant layer comprises a mordant compound of Formula A;

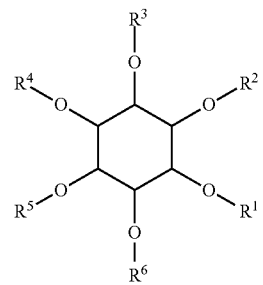

Formula A wherein:
each of $R^1$-$R^6$ is independently selected from H and —PO(OR$^7$)$_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$. A secondary conductive polymer layer is on the mordant layer.

Yet another embodiment is provided in a method of forming an electrolytic capacitor. The method comprises:
forming an anode;
forming a dielectric on the anode;

forming a primary conductive polymer layer on the dielectric;
forming a mordant layer on the primary conductive layer wherein the mordant layer comprises a mordant compound of Formula A;

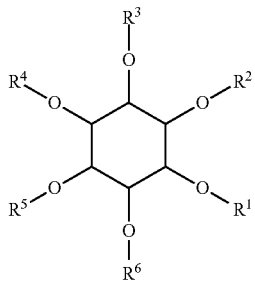

Formula A wherein:
each of $R^1$-$R^6$ is independently selected from H and —PO(OR$^7$)$_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$; and
forming a secondary conductive polymer layer conductive polymer layer on the mordant layer.

DESCRIPTION

The present invention is related to an improved electrolytic capacitor which exhibits significantly improved stability over many cycles of power cycle testing. More specifically, the present invention is related to an electrolytic capacitor comprising a mordant between adjacently applied conductive polymer layers wherein the mordant mitigates failures associated with conductive polymer layer failures.

The invention will be described with reference to the figures which are an integral, but non-limiting, part of the specification provided for clarity of the invention.

Figure 1:
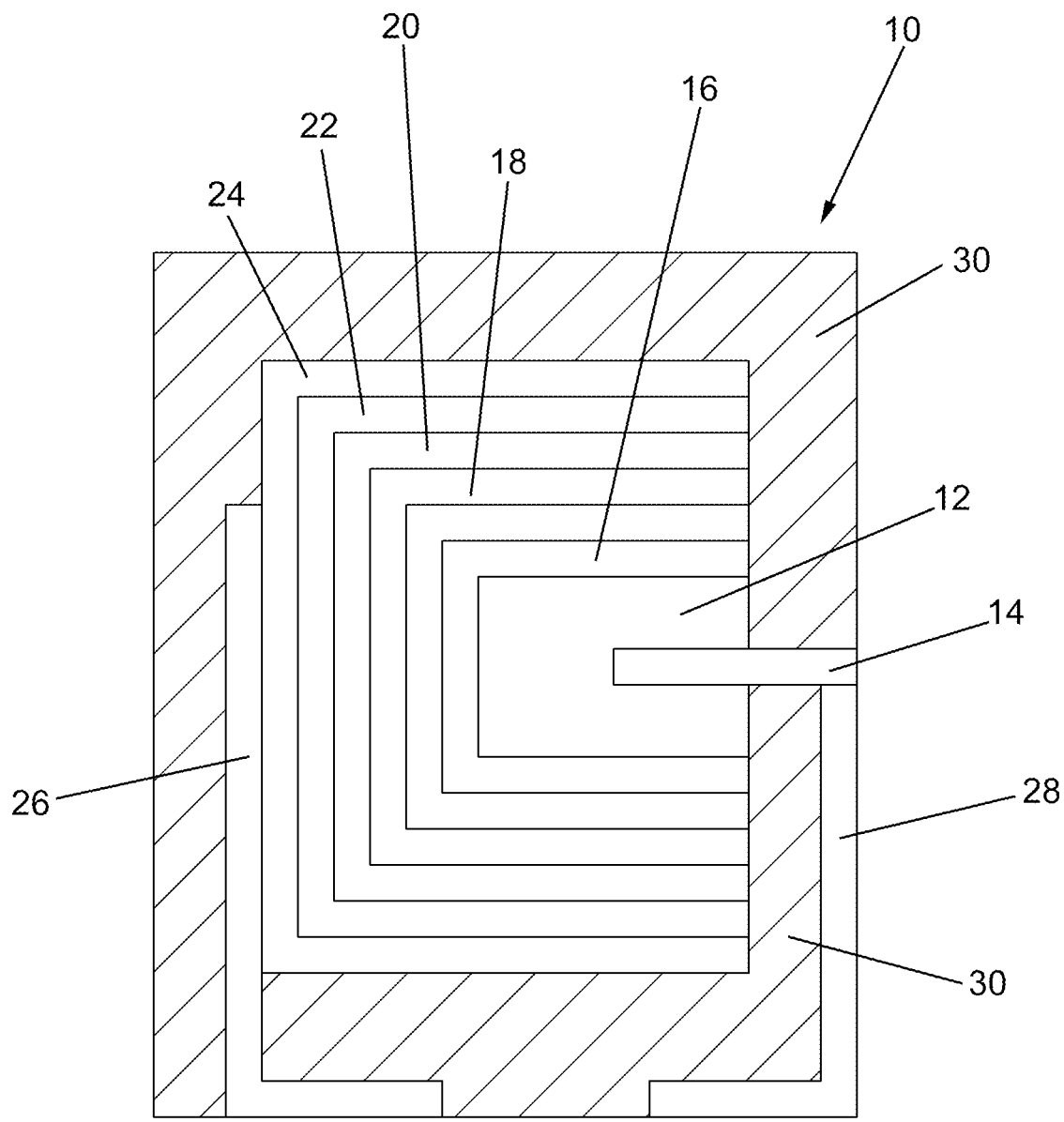
FIG. 1 is a schematic cross-sectional view of an embodiment of the invention.

An embodiment of the invention will be described with reference to FIG. 1. In FIG. 1, an inventive capacitor, 10, is illustrated schematically in cross-sectional view. The capacitor comprises an anode, 12, which is preferable a porous monolith formed by pressing a powder. An anode wire, 14, extends from the anode. The anode wire can be embedded in the powder prior to pressing, which is preferred, or the anode wire can be attached to the surface of the anode after pressing such as by welding. A dielectric, 16, is formed on the surface of the anode. While illustrated as a layer of consistent thickness the actual dielectric layer is on the interstitial surfaces of the porous monolith. A primary conductive polymer layer, 18, is on the dielectric and preferably extends into the interstitial surfaces of the monolith to increase the surface area of conductive polymer coating on the dielectric. While illustrated as a single layer, for the purposes of discussion, the primary conductive polymer layer is typically applied from multiple applications. A mordant layer, 20, is formed on the primary conductive layer wherein the mordant layer comprises a mordant compound of Formula A, described herein below, and an optional but preferred crosslinker. A secondary conductive polymer layer, 22, is formed on the mordant layer. An adhesion layer, 24, is optionally but preferably formed on the secondary conductive polymer layer. The adhesion layer allows electrical attachment of a cathode lead, 26, to the secondary conductive polymer layer such as by soldering or by a conductive adhesive. It is known in the art that attachment of a lead to a conductive polymer layer is difficult and an adhesion layer is typically used to allow good physical and electrical contact between the secondary conductive polymer layer and cathode lead. An anode lead, 28, is in electrical contact with the anode wire. An optional but preferred electrically insulating resin, 30, encases all but the bottom portion of the cathode lead and anode lead.

Figure 2:
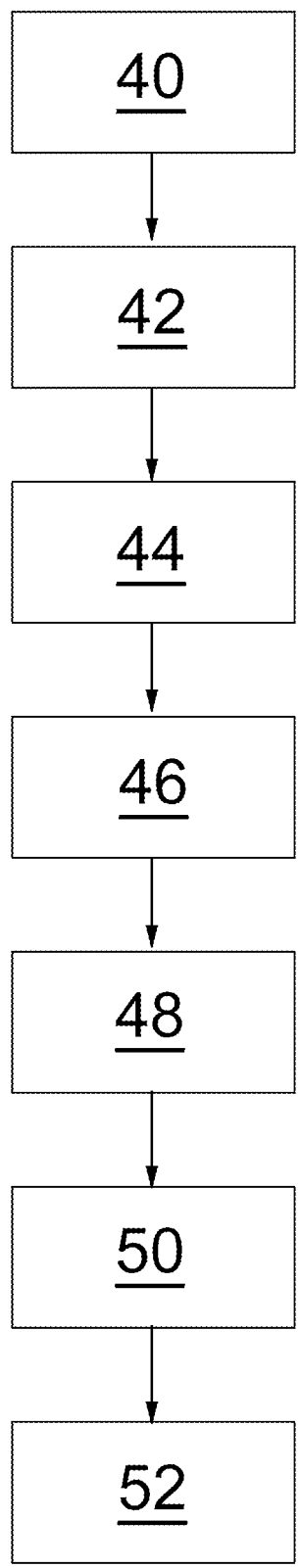
FIG. 2 is a flow-chart representation of an embodiment of the invention.

The process for forming the electrolytic capacitor will be described with reference to FIG. 2. In FIG. 2 the process for forming an electrolytic capacitor is represented in a flow chart. An anode is prepared at 40. The anode can be a foil or the anode can be prepared by pressing a powder. A pressed powder anode preferably comprises an anode wire extending therefrom. The anode is preferably sintered, particularly if a powder of niobium or tantalum is used as the anode powder. A dielectric is formed on the anode at 42. The method of forming the dielectric is not limiting with typical methods known to those of skill in the art suitable for demonstration of the invention. A primary conductive polymer layer is formed on the dielectric at 44. The primary conductive polymer layer is formed by in-situ polymerization or by the application of a pre-formed conductive polymer from a polymer solution or slurry. In-situ polymerization is well known to those of skill in the art to include polymerization of a monomer in the presence of the surface upon which the polymer is formed. In this instance the surface is the dielectric. The pre-formed conductive polymer suitable for use in forming the primary layer has a particle size of less than 20 nm and preferably below 1 nm, which is considered non-detectable, at which point the pre-formed conductive polymer is referred to as a soluble polymer. The primary conductive polymer layer is typically formed by multiple applications of the in-situ formed layer or conductive polymer solution or slurry. A mordant layer is formed on the primary conductive polymer layer at 46. The mordant layer is formed by applying a solution comprising a compound defined by Formula A, and an optional crosslinker, followed by drying. The solvent for the mordant layer application is not particularly limiting with water being exemplary for demonstration of the invention. The mordant layer may be formed from a single application of solution or sequential applications. A secondary conductive polymer layer is formed on the mordant layer at 48. The secondary conductive polymer layer is preferably formed by applying a slurry comprising a conductive polymer wherein the conductive polymer has an average particle size of at least 50 nm to no more than 200 nm. The secondary conductive polymer can also have a bimodal particle size distribution. Such properties of the conducting polymer are described in U.S. Pat. Nos. 10,650,980, and 10,658,121. The secondary conductive polymer layer is preferable formed from multiple applications of slurry. An adhesive layer is preferably formed on the secondary conductive polymer layer at 50 wherein the adhesive layer preferable comprises at least one carbon containing layer and at least one metal containing layer as known in the art. The capacitor is finished at 52 wherein finishing typically includes the attachment of cathode external terminations, anode external terminations and resin encapsulation. Testing and any electrical or physical treatment may also be included as part of the finishing step.

The secondary conductive polymer layers may have a primer layer preferably comprising a crosslinker or a weak ionic acid, between adjacent conductive polymer sub-layers to improve inter-layer adhesion. In an embodiment conductive polymer sub-layers are deposited directly on previously applied conductive polymer sub-layers without a primer there between. Primers are well known in the art as exemplified in U.S. Pat. Nos. 8,882,856, 9,761,347, 9,761,378, 10,109,428, 10,643,796 which are incorporated herein by reference. Particularly preferable primer are amine salt selected from an amine and a weak acid.

A particularly preferred anode material is a metal and a particularly preferred metal is a valve metal or a conductive oxide of a valve metal. Particularly preferred anodes comprise a material selected from the group consisting of niobium, aluminum, tantalum and NbO. Tantalum is the most preferred anode material. While not limited thereto, the advantages of the invention are most easily appreciated with high charge density powders such as above 50,000 CV/g. Below about 50,000 CV/g the issues related to power cycling are not as prevalent and therefore the advantages offered by the invention are not as readily realized. However issues related to power cycling are observed even with lower charge powders when the primary conductive layer are solely prepared from conductive polymer slurries. The effect of the type of primary conductive polymer layers and its effect on capacitance recovery and power cycling are described in U.S. Pat. No. 10,879,010. As the powder charge density increases the advantages of the invention are more readily apparent. Particularly preferred powders have a charge density above 100,000 CV/g, preferably above 200,000 CV/g and even more preferably above about 250,000 CV/g up to about 350,000 CV/g.

The anode wire is either embedded in or attached to the anode with a preference for an embedded anode wire. The material of construction for the anode wire is not particularly limited, however, it is preferable that the anode wire be the same material as the anode for manufacturing conveniences.

The dielectric, and method of forming the dielectric is not particularly limited herein. A particularly preferred dielectric is an oxide of the anode due to manufacturing considerations.

The primary conductive layer comprises a conductive polymer. The primary conductive layer is formed by in-situ polymerization of a monomer or the primary conductive layer is formed as a coating of pre-polymerized conductive polymer comprising a small average particle size, below about 20 nm, and more preferably, a soluble conductive polymer. The primary conductive polymer layers can also be a combination of insitu polymerized layers, soluble conductive polymer layers, and prepolymerized conductive polymer slurries.

An in-situ formed conductive polymer is hypothesized to more effectively enter the interstitial portions of the porous anodized anode thereby forming an improved capacitor.

A soluble conductive polymer is a conductive polymer that completely dissolves in a solvent or solvent mixture without detectable particles with below about 1 nm being considered below typical particle size detection limits.

The solvent for the soluble conductive polymer can be water, organic solvents, or mixtures of water with miscible solvents such as alcohol and non-hydroxy polar solvents such as dimethyl sulfoxide (DMSO), dimethylformamide (DMF), dimethylacetamide (DMAc), etc.

A soluble conductive polymer is believed to impregnate the pores of anodes as effectively as conductive polymers formed by in-situ methods and better than conductive polymer dispersion with detectable particles. Neither in-situ conductive polymer nor soluble conductive polymer contains polyanion dopants such as polystyrene sulfonic acid. In many cases, soluble conductive polymers contain self-doping functionalities.

The mordant layer comprises a mordant compound, defined by Formula A, and an optional but preferred crosslinker. The mordant compound of Formula A is represented by:

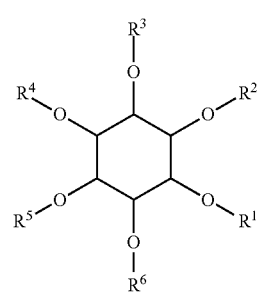

Formula A wherein:
each of $R^1$-$R^6$ is independently selected from H and —PO($OR^7$)$_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$. Preferably at least two of $R^1$-$R^6$ is —PO(OH)$_2$. More preferably at least three of $R^1$-$R^6$ is —PO(OH)$_2$. More preferably at least four of $R^1$-$R^6$ is —PO(OH)$_2$. More preferably at least five of $R^1$-$R^6$ is —PO(OH)$_2$. Most preferably each of $R^1$-$R^6$ is —PO(OH)$_2$. $R^7$ can be an unsubstituted alkyl, aryl or alkylaryl or $R^7$ can be substituted by at least one functional group selected from hydroxyl, carboxyl, amine, epoxy, silane, amide, imide, thiol, alkene, alkyne, phosphate, azide, acrylate, anhydride or an alkali metal preferably selected from lithium, sodium and potassium.

Mordant layer optionally comprises a crosslinker. The crosslinker in the mordant layer can crosslink with formula A compound and with conducting polymer. Cross-linking comprises the use of a material comprising at least two cross-linkable functionalities wherein one cross-linkable functionality forms a first bond and the second cross-linkable functionality forms a second bond thereby forming a bridge of cross-linking molecule between two molecules, oligomers, polymer or portions of a polymer. For the purposes of this disclosure the term "crosslinked crosslinker" is defined as the reaction product of a crosslinker since the crosslinker is not present as a separate compound after crosslinking. The cross-linkable functionality may form a covalent bond or an ionic bond.

The crosslinking may be between functional groups of the conductive polymer or a molecule, oligomer, or polymer. Crosslinkable functionality can be added to the conductive polymer layers thereby improving the layer integrity and the surface coverage or a crosslinkable material may be added to the conductive polymer layer. Once exposed to curing conditions, which is typically thermal curing, the crosslinkable molecules react with the crosslinker thereby forming a strongly bound interpenetrating network of covalent and ionic bonds. The crosslinkable materials preferably comprise two components with one component preferably being a compound, oligomer or polymer with multifunctional or multiple reactive groups which are well known in the art preferably selected from the group consisting of carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts, quaternary ammonium salts, polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides. The oligomer or polymer with multifunctional or multiple reactive groups preferably includes at least one carboxylic acid group and at least one hydroxyl function group. A particularly preferred oligomer or polymer with multifunctional reactive groups is a polyester containing carboxylic and hydroxyl functionality. In addition to oligomers or polymers, particles with surface functional groups can also take part in the crosslinking.

Crosslinkers includes silane compounds and epoxy compounds Particularly preferred crosslinkers comprise melamines, isocyanates, epoxies, hexamethoxymelamines, glyoxals, furfural aldehydes, melamine formaldehyde condensates, divinyl sulfones and epoxy compounds.

Organofunctional silanes and organic compounds with more than one crosslinking group, especially more than one epoxy group, are particularly suitable for use as crosslinkers for the instant invention especially when used in combination.

An exemplary organofunctional silane is defined by the formula:

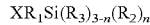

wherein X is an organic functional group such as amino, epoxy, anhydride, hydroxy, mercapto, sulfonate, carboxylate, phosphonate, halogen, vinyl, methacryloxy, ester, alkyl, etc; $R_1$ is an aryl or alkyl $(CH_2)_m$ wherein m can be 0 to 14; $R_2$ is individually a hydrolysable functional group such as alkoxy, acyloxy, halogen, amine or their hydrolyzed product; $R_3$ is individually an alkyl functional group of 1-6 carbons; n is 1 to 3.

The organofunctional silane can also be dipodal, define by the formula:

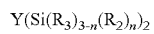

wherein Y is any organic moiety that contains reactive or nonreactive functional groups, such as alkyl, aryl, sulfide or melamine; $R_3$, $R_2$ and n are defined above. The organofunctional silane can also be multi-functional or polymeric silanes, such as silane modified polybutadiene, or silane modified polyamine, etc.

Examples of organofunctional silane include 3-glycidoxypropyltrimethoxysilane, 3-aminopropytriethoxysilane, aminopropyisilanetriol, (triethoxysilyl)propylsuccinic anhydride, 3-mercaptopropyltrimethoxysilane, vinyitrimethoxysilane, 3-methacryloxypropyitrimethoxysilane, 3-trihydroxysilyl-1-propane sulfonic acid, octyltriethyoxysilane, bis(triethoxysilyl)octane, etc. The examples are used to illustrate the invention and should not be regarded as conclusive Examples of organofunctional silane include 3-glycidoxypropyitrimethoxysilane, 3-aminopropytriethoxysilane, aminopropylsilanetriol, (triethoxysilyl)propylsuccinic anhydride, 3-mercaptopropyltrimethoxysilane, vinyltrimethoxysilane, 3-methacryloxypropyitrimethoxysilane, 3-trihydroxysilyl-1-propane sulfonic acid, octyltriethyoxysilane, bis(triethoxysilyl)octane, etc. The examples are used to illustrate the invention and should not be regarded as conclusive.

A particularly preferred organofunctional silane is glycidyl silane defined by the formula:

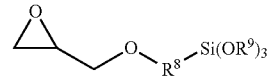

wherein $R^8$ is an alkyl of 1 to 14 carbons and more preferably selected from methyl ethyl and propyl; and each $R^9$ is independently an alkyl or substituted alkyl of 1 to 6 carbons.

A particularly preferred glycidyl silane is 3-glycidoxypropyltrimethoxysilane defined by the formula:

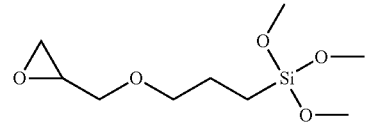

which is referred to herein as "Silane A" for convenience.

A crosslinker with at least two epoxy groups is referred to herein as an epoxy crosslinking compound and is defined by the formula:

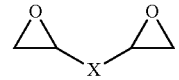

wherein the X is an alkyl or substituted alkyl of 0-14 carbons, preferably 0-6 carbons; an aryl or substituted aryl, an ethylene ether or substituted ethylene ether, polyethylene ether or substituted polyethylene ether with 2-20 ethylene ether groups or combinations thereof. A particularly preferred substitute is an epoxy group.

Examples of epoxy crosslinking compounds having more than one epoxy groups include ethylene glycol diglycidyl ether (EGDGE), propylene glycol dlglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, etc.

A preferred epoxy crosslinking compound is glycidyl ether, defined by the formula:

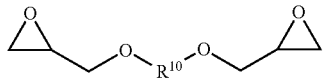

wherein $R^{10}$ is an alkyl or substituted alkyl of 1-14 carbons, preferably 2-6 carbons; an ethylene ether or polyethylene ether with 2-20 ethylene ether groups; an alkyl substituted with a group selected from hydroxy, or

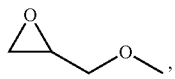

or —$(CH_2OH)_xCH_2OH$ wherein X is 1 to 14.

Particularly preferred glycidyl ethers are represented by:

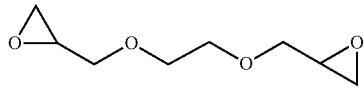 [SMILES: C(COCC1CO1)OCC1CO1]

EGDGE: ethylene glycol diglycidyl ether

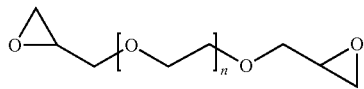

where n is an integer of 1 to 220;
PEGDGE: polyethylene glycol diglycidyl ether

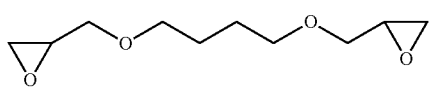

BDDGE: 1,4-butanediol diglycidyl ether

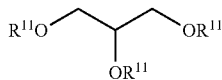

wherein one $R^{11}$ is H and each other $R^{11}$ is

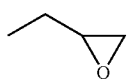

GDGE: glycerol diglycidyl ether

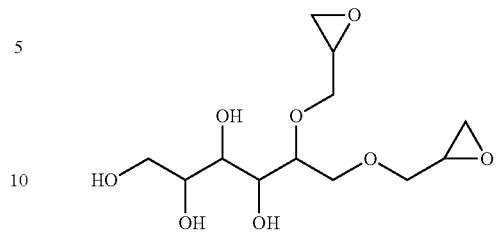

Sorbitol-DGE: sorbitol diglycidyl ether.

Mixtures of the crosslinkers may be used.

The secondary conductive polymer layer is formed from a slurry comprising a prepolymerized polymer of polythiophene and optionally a dopant such as a styrene sulfonic acid or polymer comprising styrene sulfonic acid groups. The preferred polymerization method uses a stator screen which provides a uniform droplet size resulting in average polymer particle sizes of at least about 50 nm to no more than about 200 nm, more preferably 150 nm and even more preferably below about 100 nm.

The preferred polythiophene monomer for polymerization is shown as polymerized in Formula B:

Formula B

wherein:
$R^1$ and $R^2$ independently represent linear or branched $C_1$-$C_{16}$ alkyl, $C_2$-$C_{18}$ alkoxyalkyl $C_3$-$C_8$ cycloalkyl, phenyl or benzyl which are unsubstituted or substituted by $C_1$-$C_6$ alkyl, $C_1$-$C_6$ alkoxy, halogen or $OR^3$; or
$R^1$ and $R^2$, taken together, are linear $C_1$-$C_6$ alkylene which is unsubstituted or substituted by $C_1$-$C_6$ alkyl, $C_1$-$C_6$alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ represents hydrogen, linear or branched $C_1$-$C_{16}$ alkyl or $C_2$-$C_{18}$ alkoxyalkyl, $C_3$-$C_8$ cycloalkyl, phenyl or benzyl which are unsubstituted or substituted by $C_1$-$C_6$ alkyl;
X is S;
n represents that the compound of Formula B is a polymer with a range of molecular weights; in general n is an integer of 2 to a number sufficient to reach an average molecular weight of about 500,000.

$R^1$ and $R^2$ of Formula B are preferably chosen to prohibit polymerization at the β-site of the ring as it is most preferred that only α-site polymerization be allowed to proceed. It is more preferred that $R^1$ and $R^2$ are not hydrogen and more preferably, $R^1$ and $R^2$ are α-directors with ether linkages being preferable over alkyl linkages. It is most preferred that the $R^1$ and $R^2$ are small to avoid steric interferences.

In a particularly preferred embodiment $R^1$ and $R^2$ of Formula B are taken together to represent —O—$(CHR^4)_m$—O— wherein m is an integer from 1 to 5 and most preferably 2; each $R^4$ is independently selected from hydrogen, a linear or branched $C_1$ to $C_{18}$ alkyl radical $C_5$ to $C_{12}$ cycloalkyl radical, $C_6$ to $C_{14}$ aryl radical $C_7$ to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —$(CHR^5)_a$—$R^{16}$; —$O(CHR^5)_aR^{16}$; —$CH_2O(CHR^5)_aR^{16}$, —$CH_2O(CH_2CHR^5O)_aR^{16}$, or $R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate; $R^5$ is H or alkyl chain of 1 to 5 carbons optionally substituted with functional groups selected from carboxylic acid, hydroxyl, amine, alkene, thiol, alkyne, azide, epoxy, acrylate and anhydride. $R^{16}$ is H, —$SO_3M$ or an alkyl chain of 1 to 5 carbons optionally substituted with functional groups selected from carboxylic acid, hydroxyl, amine, substituted amines, alkene, thiol, alkyne, azide, amide, imide, sulfate, $SO_3M$, amide, epoxy, anhydride, silane, acrylate and phosphate, a is integer from 0 to 10. M is a H or cation preferably selected from ammonia, sodium or potassium.

A particularly preferred polymer is 3,4-polyethylene dioxythiophene (PEDOT) which is prepared from monomeric 3,4-ethylene dioxythiophene (EDOT).

Particularly preferred conductive polymers include poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythlophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate), poly(3-aniline sulfonate), and the like.

Particularly suitable polymers or co-polymers are selected from the group consisting of poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic acid, salt), poly(N-methylpyrrole), poly(3-methylthiophene), poly(3-methoxythlophene), and poly(3,4-ethylenedioxythiophene).

The insulating resin is not particularly limited herein with any non-electrically conducting compatible resin being suitable for demonstration of the invention. If the electrolytic capacitor is embedded or encased the resin optional.

EXAMPLES

ESR (equivalent series resistance) of the capacitors were measured at 100 kHz using Agilent E4980A Precision LCR Meter. Power Cycling Test (surge voltage) was done at ambient 85° C., with rated voltage on for 5 seconds, followed by turning off the voltage for 5 seconds. The voltage on/off cycle was repeated for 60,000 times. Capacitance of the parts were tested before and after the power cycling cycles and the % capacitance change is calculated.

Comparative Example 1

A series of tantalum anodes (100 microfarads, 35V) were prepared. The tantalum was anodized to form a dielectric on the tantalum anode. An organic compound based on silane was applied on the dielectric. The anodes this formed were dipped in the oxidizer Iron Tosylate followed by dipping in EDOT monomer drying and washing. This process was repeated a few times to build PEDOT film inside the anode pores. A conductive polymer dispersion containing epoxy and silane compounds was applied to form a subsequent polymer layer. After drying, alternating layers of an amine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

Comparative Example 2

A series of tantalum anodes (100 microfarads, 35V) were prepared. The tantalum was anodized to form a dielectric on the tantalum anode. An organic compound based on silane was applied on the dielectric. The anodes this formed were dipped in the oxidizer Iron Tosylate followed by dipping in EDOT monomer drying and washing. This process was repeated a few times to build PEDOT film inside the anode pores. A crosslinker selected from bifunctional epoxy compound was applied on the surface of the PEDOT film thus formed. A conductive polymer dispersion containing epoxy and silane compounds was applied to form a subsequent polymer layer. After drying, alternating layers of an amine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

Comparative Example 3

A series of tantalum anodes (100 microfarads, 35V) were prepared. The tantalum was anodized to form a dielectric on the tantalum anode. An organic compound based on silane was applied on the dielectric. The anodes this formed were dipped in the oxidizer Iron Tosylate followed by dipping in EDOT monomer drying and washing. This process was repeated a few times to build PEDOT film inside the anode pores. A coating prepared from a bifunctional epoxy crosslinker and a polyethylene oxide and was applied on the surface of the PEDOT film thus formed. A conductive polymer dispersion containing epoxy and silane compounds was applied to form a subsequent polymer layer. After drying, alternating layers of amine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

Inventive Example 1

A series of tantalum anodes (100 microfarads, 35V) were prepared. The tantalum was anodized to form a dielectric on the tantalum anode. An organic compound based on silane was applied on the dielectric. The anodes this formed were dipped in the oxidizer Iron Tosylate followed by dipping in EDOT monomer drying and washing. This process was repeated a few times to build PEDOT film inside the anode pores. A coating comprises inositol hexaphosphate, as referred to as phytic acid, was applied on the PEDOT film. A conductive polymer dispersion containing epoxy and silane compounds was applied to form a subsequent polymer layer. After drying, alternating layers of amine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

Inventive Example 2

A series of tantalum anodes (100 microfarads, 35V) were prepared. The tantalum was anodized to form a dielectric on the tantalum anode. An organic compound based on silane was applied on the dielectric. The anodes this formed were dipped in the oxidizer Iron Tosylate followed by dipping in EDOT monomer drying and washing. This process was repeated a few times to build PEDOT film inside the anode pores. A coating comprises inositol hexaphosphate and a bifunctional crosslinker was applied on the PEDOT film. A conductive polymer dispersion containing epoxy and silane compounds was applied to form a subsequent polymer layer. After drying, alternating layers of amine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR was measured on packaged parts.

| Examples | Percentage Capacitance change after 50,000 cycles (power cycling test) | ESR (mohm) (mean) Pre 50,000 cycles | ESR (mohm) (mean) Post 50,000 cycles |
|---|---|---|---|
| Comparative Example 1 | −59.6 | 32 | 224 |
| Comparative Example 2 | −15.1 | 43 | 391 |
| Comparative Example 3 | −18.6 | 48 | 168 |
| Inventive Example 1 | −0.27 | 39 | 52 |
| Inventive Example 2 | −1.09 | 31 | 37 |

The inventive example demonstrate the advantages with a lower initial ESR and a significant improvement in capacitance loss and ESR after 50,000 power cycles. As demonstrated the inventive capacitors have a capacitance loss of less than 10%, and more preferably less than 5%, after 50,000 power cycles relative to capacitance prior to power cycling. In addition to the improved power cycling property, the inventive method also demonstrated improved ESR stability, and improved anomalous charge current properties. Anomalous charge current in solid electrolytic capacitors described elsewhere. (Y. Freeman et al 2013 ECS J. Solid State Sci. Technol. 2 N197, Chacko et al, U.S. Pat. No. 9,793,058)

The invention has been described with reference to preferred embodiments without limit thereto. One of skill in the art would realize additional embodiments which are described and set forth in the claims appended hereto.

The invention claimed is:

1. An electrolytic capacitor comprising:
an anode comprising a dielectric layer on said anode;
a primary conductive polymer layer on said dielectric;
a mordant layer on said primary conductive polymer layer wherein said mordant layer comprises a mordant compound of Formula A;

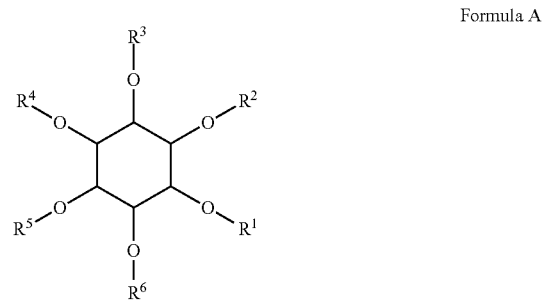

Formula A wherein:
each of $R^1$-$R^6$ is independently selected from H and —$PO(OR^7)_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is —$PO(OH)_2$;
a secondary conductive polymer layer on said mordant layer;
and wherein said mordant layer further comprises a crosslinked crosslinker.

2. The electrolytic capacitor of claim 1 wherein at least two of said $R^1$-$R^6$ is —$PO(OH)_2$.

3. The electrolytic capacitor of claim 2 wherein at least three of said $R^1$-$R^6$ is —$PO(OH)_2$.

4. The electrolytic capacitor of claim 3 wherein at least four of $R^1$-$R^6$ is —$PO(OH)_2$.

5. The electrolytic capacitor of claim 4 wherein at least five of said $R^1$-$R^6$ is —PO(OH)$_2$.

6. The electrolytic capacitor of claim 5 wherein each of said $R^1$-$R^6$ is —PO(OH)$_2$.

7. The electrolytic capacitor of claim 1 wherein said anode comprises a valve metal.

8. The electrolytic capacitor of claim 7 wherein said valve metal is selected from the group consisting of aluminum, tantalum and niobium.

9. The electrolytic capacitor of claim 1 wherein said anode comprises a powder having a charge density of at least 50,000 CV/g.

10. The electrolytic capacitor of claim 9 wherein said anode comprises a powder having a charge density of at least 100,000 CV/g.

11. The electrolytic capacitor of claim 10 wherein said anode comprises a powder having a charge density of at least 200,000 CV/g.

12. The electrolytic capacitor of claim 1 having a capacitance loss of less than 10% after 50,000 power cycles relative to a capacitance prior to power cycling.

13. The electrolytic capacitor of claim 12 having a capacitance loss of less than 5% after 50,000 power cycles relative to a capacitance prior to power cycling.

14. The electrolytic capacitor of claim 1 wherein said primary conductive polymer layer comprises a polymer selected from the group consisting of a polymer layer formed by in-situ polymerization and a polymer layer formed from a pre-polymerized polymer have a particle size of less than 20 nm.

15. The electrolytic capacitor of claim 14 wherein said pre-polymerized polymer has a particle size of less than 1 nm.

16. The electrolytic capacitor of claim 15 wherein said pre-polymerized polymer is a soluble polymer.

17. The electrolytic capacitor of claim 1 wherein said crosslinked crosslinker has a crosslinked functionality selected from the group consisting of carboxylic, hydroxyl, amine, epoxy, anhydride, isocyanate, imide, amide, carboxyl, carboxylic anhydride, silane, oxazoline, (meth)acrylate, vinyl, maleate, maleimide, itaconate, allyl alcohol ester, dicyclo-pentadiene-based unsaturation, unsaturated $C_{12}$-$C_{22}$ fatty ester, unsaturated $C_{12}$-$C_{22}$ fatty amides, carboxylic acid salt, quaternary ammonium salt, polyester, polyurethane, polyamide, polyamine, polyimide, silicone polyester, hydroxyl functional silicone, hydroxyethyl cellulose, polyvinyl alcohol, phenolic, epoxy, butyral and mixtures thereof.

18. The electrolytic capacitor of claim 1 wherein said crosslinked crosslinker comprises at least amine group.

19. The electrolytic capacitor of claim 1 wherein said crosslinked crosslinker comprises at least one group selected from melamine, isocyanate, epoxy, hexamethoxymelamine, glyoxal, furfural aldehyde, melamine formaldehyde condensate, divinyl sulfone and epoxy compounds.

20. The electrolytic capacitor of claim 1 wherein said crosslinked crosslinker is an organofunctional silane defined by the formula:

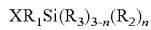

wherein X is an organic functional group selected from the group consisting of amino, epoxy, anhydride, hydroxy, mercapto, sulfonate, carboxylate, phosphonate, halogen, vinyl, methacryloxy, ester and alkyl;

$R_1$ is an aryl or alkyl $(CH_2)_m$ wherein m is 0 to 14;

$R_2$ is individually a hydrolysable functional group selected from the group consisting of alkoxy, acyloxy, halogen, amine or their hydrolyzed product;

$R_3$ is individually an alkyl functional group of 1-6 carbons; and n is 1 to 3.

21. The electrolytic capacitor of claim 1 wherein said crosslinked crosslinker is define by the formula:

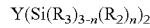

wherein Y is an organic moiety comprising reactive or nonreactive functional groups;

$R_2$ is individually a hydrolysable functional group selected from the group consisting of alkoxy, acyloxy, halogen, amine and their hydrolyzed product;

$R_3$ is individually an alkyl functional group of 1-6 carbons; and n is 1 to 3.

22. The electrolytic capacitor of claim 1 wherein said crosslinked crosslinker is selected from the group consisting of 3-glycidoxypropyltrimethoxysilane, 3-aminopropytriethoxysilane, aminopropylsilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic add, octyltriethyoxysilane and bis(triethoxysilyl)octane.

23. The electrolytic capacitor of claim 1 wherein said crosslinked crosslinker is defined by the formula:

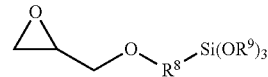

wherein $R^8$ is an alkyl of 1 to 14 carbons and more preferably selected from methyl ethyl and propyl; and each $R^9$ is independently an alkyl or substituted alkyl of 1 to 6 carbons.

24. The electrolytic capacitor of claim 1 wherein said crosslinked crosslinker is defined by the formula:

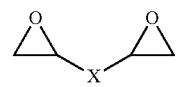

wherein X is an alkyl or substituted alkyl of 0-14 carbons an aryl or substituted aryl, an ethylene ether or substituted ethylene ether, polyethylene ether or substituted polyethylene ether with 2-20 ethylene ether groups or combinations thereof.

25. The electrolytic capacitor of claim 1 wherein said crosslinked crosslinker is selected from the group consisting of ethylene glycol diglycidyl ether, propylene, glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, and maleimide-epoxy compounds.

26. The electrolytic capacitor of claim 1 wherein said crosslinked crosslinker defined by the formula:

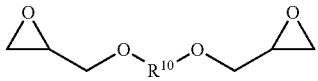

wherein $R^{10}$ is an alkyl or substituted alkyl of 1-14 carbons, an ethylene ether or polyethylene ether with 2-20 ethylene ether groups, an alkyl substituted with a group selected from hydroxy,

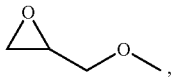

—$(CH_2OH)_xCH_2OH$ wherein X is 1 to 14.

27. The electrolytic capacitor of claim 1 wherein said crosslinked crosslinker is selected from the group consisting of:

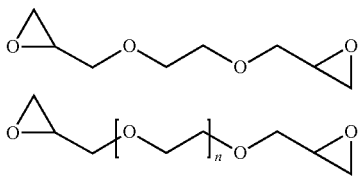

where n is an integer of 1 to 220;

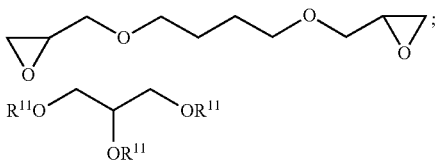

wherein one $R^{11}$ is H and each other $R^{11}$ is

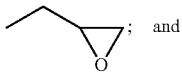
; and

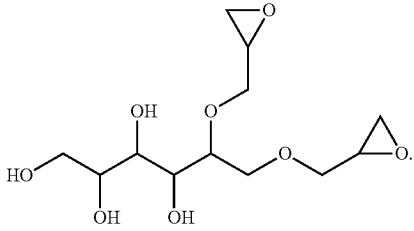

28. The electrolytic capacitor of claim 1 wherein said secondary conductive polymer layer comprises primer.

29. The electrolytic capacitor of claim 1 wherein at least one of said primary conductive polymer layer or said secondary conductive polymer layer comprises a polymer defined by Formula B:

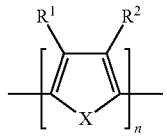

Formula B wherein:
$R^1$ and $R^2$ independently represent linear or branched $C_1$-$C_{16}$ alkyl or $C_2$-$C_{18}$ alkoxyalkyl; $C_3$-$C_8$ cycloalkyl, phenyl or benzyl which are unsubstituted or substituted by $C_1$-$C_6$ alkyl, $C_1$-$C_6$ alkoxy, halogen or $OR^3$; or
$R^1$ and $R^2$, taken together, are a linear $C_1$-$C_6$ alkylene which is unsubstituted or substituted by $C_1$-$C_6$ alkyl, $C_1$-$C_6$alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl, halobenzyl or a 5-, 6-, or 7-membered heterocyclic structure containing two oxygen elements;
$R^3$ represents hydrogen, linear or branched $C_1$-$C_{16}$ alkyl, $C_2$-$C_{18}$ alkoxyalkyl, $C_3$-$C_8$ cycloalkyl, phenyl or benzyl which are unsubstituted or substituted by $C_1$-$C_6$ alkyl;
X is S; and
n is an integer of 2 to a number sufficient to reach a molecular weight of about 500,000.

30. The electrolytic capacitor of claim 29 wherein $R^1$ and $R^2$ are taken together to represent —O—$(CHR^4)_m$—O— wherein:
m is an integer from 1 to 5;
$R^4$ is independently selected from hydrogen; a linear or branched $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical or $C_1$ to $C_4$ hydroxyalkyl radical, unsubstituted or substituted with a functional group selected from carboxylic acid, hydroxyl, amine, alkene, acrylate, thiol, alkyne, azide, sulfate, sulfonate, sulfonic acid, imide, amide, epoxy, anhydride, silane, phosphate, hydroxyl, —$(CHR^5)_a$—$R^{16}$; —O(CH $R^5)_aR^{16}$; —$CH_2O$ $(CHR^5)_aR^{16}$; or —$CH_2O(CH_2CHR^5O)_aR^{16}$, or
$R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate;
$R^5$ is H or an alkyl chain of 1 to 5 carbons which is unsubstituted or substituted with a functional group selected from the group consisting of carboxylic acid; hydroxyl, amine, alkene, thiol, alkyne, azide, epoxy, acrylate and anhydride;
$R^{16}$ is H, —$SO_3M$ or an alkyl chain of 1 to 5 carbons which is unsubstituted or substituted with a functional groups selected from the group consisting of carboxylic acid, hydroxyl, amine, alkene, thiol, alkyne, azide, amide, imide, sulfate, —$SO_{3M}$, amide, epoxy, anhydride, silane, acrylate and phosphate;
a is integer from 0 to 10; and
M is H or a cation selected the group consisting of from ammonia, sodium and potassium.

31. The electrolytic capacitor of claim 29 wherein said polymer is 3,4-polyethylene dioxythiophene.

32. The electrolytic capacitor of claim 29 wherein said polymer is selected from the group consisting of poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)

methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate) and poly(3-aniline sulfonate).

33. The electrolytic capacitor of claim 29 wherein said polymer is selected from the group consisting of poly(4-(2,3-dihydrothieno-[3,4-b][1,4]dioxin-2-yl)methoxy)-1-butane-sulphonic add, salt), poly(4-(2,3-dihydrothieno-[3,4-b][1,4]dioxin-2-yl)methoxy)-1-methyl-1-propane-sulphonic acid, salt), poly(N-methylpyrrole), poly(3-methylthiophene), poly(3-methoxythiophene), and poly(3,4-ethylenedioxythiophene).

34. An electrolytic capacitor comprising:
an anode comprising a dielectric layer on said anode;
a primary conductive polymer layer on said dielectric;
a mordant layer on said primary conductive polymer layer wherein said mordant layer comprises a mordant compound of Formula A;

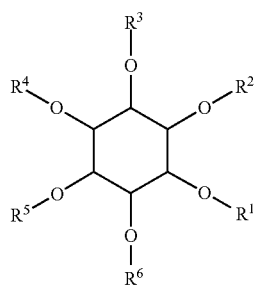

Formula A wherein:
each of $R^1$-$R^6$ is independently selected from H and —PO(OR$^7$)$_2$ wherein each $R^7$ is independently selected from substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$; and
a secondary conductive polymer layer on said mordant layer wherein $R^7$ is substituted by at least one functional group selected from the group consisting of hydroxyl, carboxyl, amine, epoxy, silane, amide, imide, thiol, alkene, alkyne, phosphate, azide, acrylate, anhydride and an alkali metal.

35. A method of forming an electrolytic capacitor comprising:
forming an anode;
forming a dielectric on said anode;
forming a primary conductive polymer layer on said dielectric;
forming a mordant layer on said primary conductive polymer layer wherein said mordant layer comprises a mordant compound of Formula A;

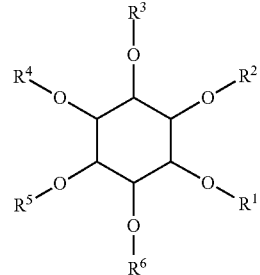

Formula A wherein:
each of $R^1$-$R^6$ is independently selected from H and —PO(OR$^7$)$_2$ wherein each $R^7$ is independently selected from H, substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$;
forming a secondary conductive polymer layer conductive polymer layer on said mordant layer; and
wherein said forming said mordant layer further comprises adding a crosslinker.

36. The method of forming an electrolytic capacitor of claim 35 wherein at least two of said $R^1$-$R^6$ is —PO(OH)$_2$.

37. The method of forming an electrolytic capacitor of claim 36 wherein at least three of said $R^1$-$R^6$ is —PO(OH)$_2$.

38. The method of forming an electrolytic capacitor of claim 37 wherein at least four of $R^1$-$R^6$ is —PO(OH)$_2$.

39. The method of forming an electrolytic capacitor of claim 38 wherein at least five of said $R^1$-$R^6$ is —PO(OH)$_2$.

40. The method of forming an electrolytic capacitor of claim 39 wherein each of said $R^1$-$R^6$ is —PO(OH)$_2$.

41. The method of forming an electrolytic capacitor of claim 35 wherein said anode comprises a valve metal.

42. The method of forming an electrolytic capacitor of claim 41 wherein said valve metal is selected from the group consisting of aluminum, tantalum and niobium.

43. The method of forming an electrolytic capacitor of claim 35 wherein said anode comprises a powder having a charge density of at least 50,000 CV/g.

44. The method of forming an electrolytic capacitor of claim 43 wherein said anode comprises a powder having a charge density of at least 100,000 CV/g.

45. The method of forming an electrolytic capacitor of claim 44 wherein said anode comprises a powder having a charge density of at least 200,000 CV/g.

46. The method of forming an electrolytic capacitor of claim 35 wherein said capacitor has a capacitance loss of less than 10% after 50,000 power cycles relative to a capacitance prior to power cycling.

47. The method of forming an electrolytic capacitor of claim 46 wherein said capacitor has a capacitance loss of less than 5% after 50,000 power cycles relative to capacitance prior to power cycling.

48. The method of forming an electrolytic capacitor of claim 35 wherein said forming said primary conductive polymer layer comprises in-situ polymerization.

49. The method of forming an electrolytic capacitor of claim 35 wherein said forming said primary conductive polymer layer comprises applying a pre-polymerized polymer having a particle size of less than 20 nm.

50. The method of forming an electrolytic capacitor of claim 49 wherein said pre-polymerized polymer has a particle size of less than 1 nm.

51. The method of forming an electrolytic capacitor of claim 50 wherein said pre-polymerized polymer is a soluble polymer.

52. The method of forming an electrolytic capacitor of claim 35 wherein said crosslinker has a crosslinkable functionality selected from the group consisting of carboxylic, hydroxyl, amine, epoxy, anhydride, isocyanate, imide, amide, carboxyl, carboxylic anhydride, silane, oxazoline, (meth)acrylate, vinyl, maleate, maleimide, itaconate, allyl alcohol ester, dicyclo-pentadiene-based unsaturation, unsaturated $C_{12}$-$C_{22}$ fatty ester, unsaturated $C_{12}$-$C_{22}$ fatty amides, carboxylic acid salt, quaternary ammonium salt, polyester, polyurethane, polyamide, polyamine, polyimide, silicone polyester, hydroxyl functional silicone, hydroxyethyl cellulose, polyvinyl alcohol, phenolic, epoxy, butyral and mixtures thereof.

53. The method of forming an electrolytic capacitor of claim 35 wherein said crosslinker comprises at least amine group.

54. The method of forming an electrolytic capacitor of claim 35 wherein said crosslinker comprises at least one group selected from melamine, isocyanate, epoxy, hexamethoxymelamine, glyoxal, furfural aldehyde, melamine formaldehyde condensate, divinyl sulfone and epoxy compounds.

55. The method of forming an electrolytic capacitor of claim 35 wherein said crosslinker is an organofunctional silane defined by the formula:

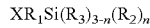

wherein X is an organic functional group selected from the group consisting of amino, epoxy, anhydride, hydroxy, mercapto, sulfonate, carboxylate, phosphonate, halogen, vinyl, methacryloxy, ester and alkyl;

$R_1$ is an aryl or alkyl $(CH_2)_m$ wherein m is 0 to 14;

$R_2$ is individually a hydrolysable functional group selected from the group consisting of alkoxy, acyloxy, halogen, amine or their hydrolyzed product;

$R_3$ is individually an alkyl functional group of 1-6 carbons; and n is 1 to 3.

56. The method of forming an electrolytic capacitor of claim 35 wherein said crosslinker is define by the formula:

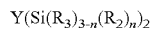

wherein Y is an organic moiety comprising reactive or nonreactive functional groups;

$R_2$ is individually a hydrolysable functional group selected from the group consisting of alkoxy, acyloxy, halogen, amine and their hydrolyzed product;

$R_3$ is individually an alkyl functional group of 1-6 carbons; and n is 1 to 3.

57. The method of forming an electrolytic capacitor of claim 35 wherein said crosslinker is selected from the group consisting of 3-glycidoxypropyltrimethoxysilane, 3-aminopropyltriethoxysilane, aminopropyisilanetriol, (triethoxysilyl)propylsuccinic anhydride, 3-mercaptopropyltrimethoxysilane, vinyltrimethoxysilane, 3-methacryloxypropyltrimethoxysilane, 3-trihydroxysilyl-1-propane sulfonic acid, octyltriethyoxysilane and bis(triethoxysilyl)octane.

58. The method of forming an electrolytic capacitor of claim 35 wherein said crosslinker is defined by the formula:

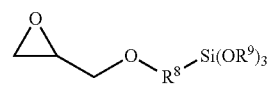

wherein $R^8$ is an alkyl of 1 to 14 carbons and more preferably selected from methyl ethyl and propyl; and each $R^9$ is independently an alkyl or substituted alkyl of 1 to 6 carbons.

59. The method of forming an electrolytic capacitor of claim 35 wherein said crosslinker is defined by the formula:

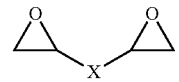

wherein X is an alkyl or substituted alkyl of 0-14 carbons an aryl or substituted aryl, an ethylene ether or substituted ethylene ether, polyethylene ether or substituted polyethylene ether with 2-20 ethylene ether groups or combinations thereof.

60. The method of forming an electrolytic capacitor of claim 35 wherein said crosslinker is selected from the group consisting of ethylene glycol diglycidyl ether, propylene glycol diglycidyl ether, 1,4-butanediol diglycidyl ether, pentylene glycol diglycidyl ether, hexylene glycol diglycidyl ether, cyclohexane dimethanol diglycidyl ether, resorcinol glycidyl ether, glycerol diglycidyl ether, glycerol polyglycidyl ethers, diglycerol polyglycidyl ethers, trimethylolpropane polyglycidyl ethers, sorbitol diglycidyl ether, sorbitol polyglycidyl ethers, polyethylene glycol diglycidyl ether, polypropylene glycol diglycidyl ether, polytetramethylene glycol diglycidyl ether, di(2,3-epoxypropyl)ether, 1,3-butadiene diepoxide, 1,5-hexadiene diepoxide, diepoxyoctane, 1,2,5,6-diepoxycyclooctane, 4-vinyl cyclohexene diepoxide, bisphenol A diglycidyl ether, and maleimide-epoxy compounds.

61. The method of forming an electrolytic capacitor of claim 35 wherein said crosslinker defined by the formula:

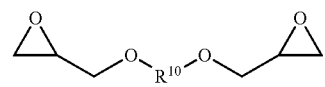

wherein $R^{10}$ is an alkyl or substituted alkyl of 1-14 carbons, an ethylene ether or polyethylene ether with 2-20 ethylene ether groups, an alkyl substituted with a group selected from hydroxy,

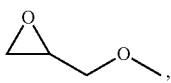

—(CH$_2$OH)$_x$CH$_2$OH wherein X is 1 to 14.

62. The method of forming an electrolytic capacitor of claim 35 wherein said crosslinker is selected from the group consisting of:

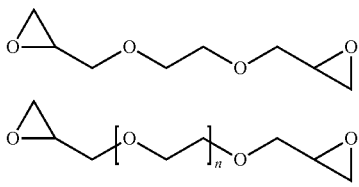

where n is an integer of 1 to 220;

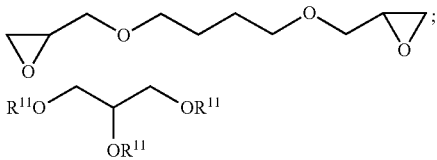

wherein one R$^{11}$ is H and each other R$_{11}$ is

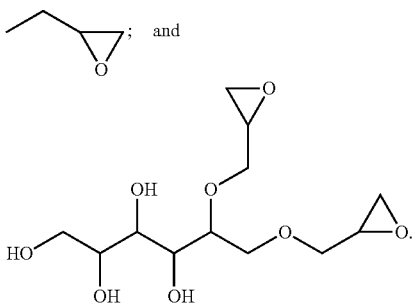

63. The method of forming an electrolytic capacitor of claim 35 wherein said secondary conductive polymer layer further comprises addition of a primer.

64. The method of forming an electrolytic capacitor of claim 63 wherein said primer is between adjacent conductive polymer sub-layers.

65. The method of forming an electrolytic capacitor of claim 35 wherein at least one of said primary conductive polymer layer or said secondary conductive polymer layer comprises a polymer defined by Formula B:

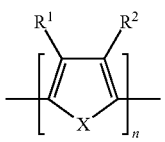

Formula B wherein:
R$^1$ and R$^2$ independently represent linear or branched C$_1$-C$_{16}$ alkyl or C$_2$-C$_{18}$ alkoxyalkyl; C$_3$-C$_8$ cycloalkyl, phenyl or benzyl which are unsubstituted or substituted by C$_1$-C$_6$ alkyl, C$_1$-C$_6$ alkoxy, halogen or OR$^3$; or R$^1$ and R$^2$, taken together, are a linear C$_1$-C$_6$ alkylene which is unsubstituted or substituted by C$_1$-C$_6$ alkyl, C$_1$-C$_6$alkoxy, halogen, C$_3$-C$_8$ cycloalkyl, phenyl, benzyl, C$_1$-C$_4$ alkylphenyl, C$_1$-C$_4$ alkoxyphenyl, halophenyl, C$_1$-C$_4$ alkylbenzyl, C$_1$-C$_4$ alkoxybenzyl, halobenzyl or a 5-, 6-, or 7-membered heterocyclic structure containing two oxygen elements;

R$^3$ represents hydrogen, linear or branched C$_1$-C$_{16}$ alkyl, C$_2$-C$_{18}$ alkoxyalkyl, C$_3$-C$_8$ cycloalkyl, phenyl or benzyl which are unsubstituted or substituted by C$_1$-C$_6$ alkyl;

X is S; and n is an integer of 2 to a number sufficient to reach a molecular weight of about 500,000.

66. The method of forming an electrolytic capacitor of claim 65 wherein R$^1$ and R$^2$ are taken together to represent —O—(CHR$^4$)$_m$—O— wherein:

m is an integer from 1 to 5;

R$^4$ is independently selected from hydrogen; a linear or branched C$_1$ to C$_{18}$ alkyl radical, C$_5$ to C$_{12}$ cycloalkyl radical, C$_6$ to C$_{14}$ aryl radical, C$_7$ to C$_{18}$ aralkyl radical or C$_1$ to C$_4$ hydroxyalkyl radical, unsubstituted or substituted with a functional group selected from carboxylic acid, hydroxyl, amine, alkene, acrylate, thiol, alkyne, azide, sulfate, sulfonate, sulfonic acid, imide, amide, epoxy, anhydride, silane, phosphate, hydroxyl, —(CHR$^5$)$_a$—R$^{16}$; —O(CHR$^5$)$_a$R$^{16}$; —CH$_2$O(CHR$^5$)$_a$R$^{16}$; or —CH$_2$O(CH$_2$CHR$^5$O)$_a$R$^{16}$, or R$^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, SO$_3$M, anhydride, silane, acrylate and phosphate;

R$^5$ is H or an alkyl chain of 1 to 5 carbons which is unsubstituted or substituted with a functional group selected from the group consisting of carboxylic acid hydroxyl, amine, alkene, thiol, alkyne, azide, epoxy, acrylate and anhydride;

R$^{16}$ is H, —SO$_3$M or an alkyl chain of 1 to 5 carbons which is unsubstituted or substituted with a functional groups selected from the group consisting of carboxylic acid, hydroxyl, amine, alkene, thiol, alkyne, azide, amide, imide, sulfate, —SO$_{3M}$, amide, epoxy, anhydride, silane, acrylate and phosphate;

a is integer from 0 to 10; and

M is H or a cation selected the group consisting of from ammonia, sodium and potassium.

67. The method of forming an electrolytic capacitor of claim 65 wherein said polymer is 3,4-polyethylene dioxythiophene.

68. The method of forming an electrolytic capacitor of claim 65 wherein said polymer is selected from the group consisting of poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt); poly(4-(2,3-dihydrothieno-[3,4-b][1,4]dioxin-2-yl) methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole); poly(3-dodecylpyrrole), poly(3,4-dimethylpyrrole), poly(3,4-dibutylpyrrole), poly(3-carboxypyrrole), poly(3-methyl-4-carboxypyrrole), poly (3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate) and poly(3-aniline sulfonate).

69. The method of forming an electrolytic capacitor of claim 65 wherein said polymer is selected from the group consisting of poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic add, salt), poly(N-methylpyrrole), poly(3-methylthiophene), poly(3-methoxythiophene), and poly(3,4-ethylenedioxythiophene).

70. A method of forming an electrolytic capacitor comprising:
    forming an anode;
    forming a dielectric on said anode;
        forming a primary conductive polymer layer on said dielectric;
    forming a mordant layer on said primary conductive polymer layer wherein said mordant layer comprises a mordant compound of Formula A;

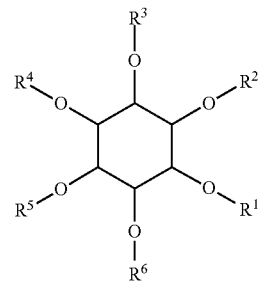

Formula A wherein:
each of $R^1$-$R^6$ is independently selected from H and —PO(OR$^7$)$_2$ wherein each $R^7$ is independently selected from substituted or unsubstituted alkyl of 1-20 carbons, substituted or unsubstituted aryl of 6-20 carbons or an alkylaryl of 7-21 carbons; with the proviso that at least one of $R^1$-$R^6$ is —PO(OH)$_2$; and
forming a secondary conductive polymer layer conductive polymer layer on said mordant layer wherein $R^7$ is substituted by at least one functional group selected from the group consisting of hydroxyl, carboxyl, amine, epoxy, silane, amide, imide, thiol, alkene, alkyne, phosphate, azide, acrylate, anhydride and an alkali metal.

* * * * *